(12) United States Patent
Zimmer

(10) Patent No.: US 6,726,122 B2
(45) Date of Patent: Apr. 27, 2004

(54) HEATABLE WASHER SYSTEM

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/030,470

(22) PCT Filed: Mar. 12, 2001

(86) PCT No.: PCT/DE01/00919

§ 371 (c)(1),
(2), (4) Date: Apr. 9, 2002

(87) PCT Pub. No.: WO01/85500

PCT Pub. Date: Nov. 15, 2001

(65) Prior Publication Data

US 2002/0134857 A1 Sep. 26, 2002

(30) Foreign Application Priority Data

May 10, 2000 (DE) .......................... 100 22 725

(51) Int. Cl.⁷ ................................. B05B 1/10
(52) U.S. Cl. ................. 239/284.1; 239/132; 239/130; 239/128; 239/75; 15/250.04; 15/250.05
(58) Field of Search .................. 239/284.1, 284.2, 239/128, 130, 132, 133, 135, 75; 15/250.001, 250.002, 250.003, 250.01, 250.02, 250.03, 250.4, 250.05

(56) References Cited

U.S. PATENT DOCUMENTS

| | | | |
|---|---|---|---|
| 4,090,668 A | * 5/1978 | Kochenour | 239/130 |
| 4,700,424 A | 10/1987 | Hagen | |
| 6,133,546 A | * 10/2000 | Bains | 219/202 |
| 6,257,500 B1 | * 7/2001 | Petzold et al. | 239/284.1 |
| 6,561,209 B2 | * 5/2003 | Wojan et al. | 137/79 |

FOREIGN PATENT DOCUMENTS

| | | |
|---|---|---|
| DE | 198 15 171 A1 | 6/1999 |
| DE | 199 13 193 A1 | 10/2000 |

* cited by examiner

Primary Examiner—Dinh Q. Nguyen
(74) Attorney, Agent, or Firm—Michael J. Striker

(57) ABSTRACT

The invention is based on a heatable washer system (10) for vehicle windows having at least one spraying nozzle (16) that is acted upon with washer fluid via a pressure valve (38), and the housing (40) of which is connected via a water line (14) to a water pump (20, 58) that delivers washer fluid from a reservoir (12) to the spraying nozzle (16), wherein a heating device (18) is located in the reservoir (12).

It is proposed that the water line (14) comprise two passages (26, 28), one (26) of which is connected to the pressure side of the water pump (20), and the other (28) of which is connected to the reservoir (12).

13 Claims, 4 Drawing Sheets

HEATABLE WASHER SYSTEM

PRIOR ART

The invention is based on a heatable washer system according to the preamble of claim 1.

Windshield washer systems for vehicles are usually used in conjunction with windshield wipers. They are actuated when the moisture from precipitation is not sufficient to clean the vehicle windshield. They contain a reservoir, spraying nozzles, and a water pump that delivers washer fluid—to which cleaning and antifreeze additives are possibly added—with pressure from the reservoir via water lines to the spraying nozzles. The spraying nozzles are usually secured to a part of a vehicle body, e.g., to an engine hood, a window frame or the like. To prevent the spraying nozzles from freezing at temperatures below the freezing point, heating elements are integrated in the spraying nozzles that are connected to a power supply via outboard connector plugs. The heating elements require a relatively high manufacturing expenditure for the spraying nozzles and a large installation expenditure in order to lay the electrical cables and contact the connector plugs. Moreover, the highly volatile antifreeze additives evaporate quickly and the residues cause the nozzle openings to clog.

It has already been made known in DE 198 15 171 A1 to secure spraying nozzles as additional elements to the wiper blade, as the mounting element, and therefore to distribute the sprayed water directly onto the wiped area with streams of short length. Since the sprayed water is concentrated in an area in the vicinity of the wiper blade and is wiped away very quickly by the wiping motion, the view is obscured only briefly by the sprayed water used. A disadvantage of such systems, however, is that weathering influences, in particular hail and extreme effects of the sun, strongly influence the flexible parts of this arrangement, which are required to bridge the hinged regions between wiper arm and wiper blade. Moreover, the spraying nozzles and water lines—which are exposed to the air stream—quickly freeze shut at temperatures below the freezing point if an insufficient quantity of antifreeze additive is added to the water. It usually takes a great deal of effort to thaw out the frozen water lines and spraying nozzles.

In order to prevent freezing of the spraying nozzles secured to the wiper arm or wiper blade, and the connected water line, a heating cable is provided in the water line. This is particularly important for wipers having larger wiper blade lengths and a plurality of spraying nozzles. Because, in this case, the spraying nozzles are located on the wiper blade at a certain distance next to each other and they are exposed to the ambient temperature just like the connecting water line.

The older patent application DE 199 13 193 describes a washer system, the spraying nozzles of which have an uninterrupted water passage that comprises, on its ends, a coupler to the continuing water line. This leads to a further spraying nozzle or the reservoir. A cap plug that closes the water passage is clipped on the coupler at the last spraying nozzle. In order to adjust the spraying nozzles and the water lines well to the respective mounting elements, the couplers of the spraying nozzles have a straight or angled form as necessary.

The nozzle body of the spraying nozzle is made out of plastic and is clipped into a housing. A connecting passage branches off from the continuous water passage of the spraying nozzle, and leads to a spraying passage with a nozzle opening. When pressure builds up in the water pump, washer fluid is pushed out of the reservoir through the lines of the system to the nozzle opening and then moves through the nozzle opening into the open. One variant proposes a non-return valve so that washer fluid does not flow back in the unpressurized state, so that the lines are partially emptied. A diaphragm thereby closes the connecting passage in the unpressurized state. This can lie close to the nozzle opening, so that only a small volume of water is stored between the diaphragm and the nozzle opening and can flow out or evaporate in uncontrolled fashion.

The diaphragm is designed as a rubber-elastic hose diaphragm that has beads on its ends. These are embedded in ring grooves of the nozzle body. When the washer fluid flows through the connecting passage, a ring space on the circumference of the nozzle body is filled and the diaphragm is expanded. The diaphragm is thereby supported externally on the housing and clears the outlet openings of the connecting passage and the spray passage on the circumference of the nozzle body.

Washer systems are also on the market in which a heating element is located in the reservoir for the washer fluid. Although the warmed washer fluid improves the cleaning force of the spraying nozzles, the spraying nozzles cannot be prevented from freezing if frost develops during breaks in operation without additional heating elements.

ADVANTAGES OF THE INVENTION

According to the invention, the water line in a heatable washer system has two passages, one of which is connected to the pressure side of the water pump, and the other of which is connected to the reservoir and, thereby, to the suction side of the water pump. An open circulation is produced as a result, in which the water pump circulates the warmed washer fluid, supplies the washer system with heat, and therefore prevents parts of the washer system from freezing if frost develops, without additional heating elements. All spraying nozzles that are connected to the water line have pressure valves in front of their nozzle opening that are advantageously designed as non-return valves. During the circulation operation, the pressure in the water line is below the opening pressure of the pressure valves. In order to actuate the spraying nozzles, the pressure in the water line is raised above the opening pressure of the pressure valves, so that washer fluid is sprayed through the opened pressure valves and the nozzle openings onto the vehicle windshield. The spraying procedure is ended by reducing the pressure in the water line to the circulating pressure.

The pressure in the water line can be created in different fashions. According to one embodiment of the invention, a two-step water pump is provided. In the first step, it produces the operating pressure for the circulation operation, while, in the second step, it is designed for the spraying pressure. By switching from one step to the next, the washing function is activated or ended. A steplessly variable [water pump] can be used instead of a two-step water pump. This is advantageously controlled below the opening pressure of the pressure valve as a function of temperature, so that the circulation performance and, therefore, the energy consumption of the water pump, can be adapted to the respective requirements. Furthermore, unnecessary evaporation of washer fluid at the spraying nozzles—which can result in the formation of deposits—is prevented.

Using a constantly-delivering water pump, the pressure in the water line can be controlled by means of a controllable pressure limiting valve. This can be located basically on the suction side or the pressure side of the water pump. If the pressure limiting valve lies on the pressure side, it is practical to provide a pressure valve opening in the delivery direction and designed as a non-return valve parallel to the pressure limiting valve. If a spraying pressure is controlled at the pressure limiting valve, the pressure valve opens, in order to make larger delivery quantities available quickly.

A further possibility for pressure control lies in the fact that an adjustable restrictor is provided in the water line. Depending on the control of the nozzle, the flow rate through the water line increases, which, with a positioning in the inlet, leads to a pressure increase and, with a positioning in the return, leads to a pressure reduction. A temperature-dependent control of the circulation quantity is possible hereby as well.

According to one embodiment, the heating element located in the reservoir can be controlled as a function of the external temperature, independently of the flow rate of washer fluid, so that the temperature of the washer fluid is kept within a desired temperature range in accordance with the external temperature. It is hereby sufficient when the washer fluid in the reservoir is only heated below +5° C.

All variants represent simple embodiments of a heatable washer system, because additional heating cables in the water lines up to the spraying nozzles are eliminated. Additionally, additional contacts required for electrical heating elements located at the spraying nozzles can be eliminated. In advantageous fashion, electrical contact sites are provided only at the reservoir, which can also be used simultaneously for the heating device and the water pump, if necessary.

In order to make an optimal heating of the complete system possible with minimal use of energy, the invention provides that the washer system comprises a washer module with integrated water pump, heating device, and electronics that processes input signals, such as the external temperature or the actuation of the switch on the steering column, for example, into an output signal for heating or changing the flow rate of the washer fluid. In a variant of the invention, the washer module is controlled by means of external vehicle or wiper electronics. The proposed means of attaining a heatable washer system should be used mainly in systems having spraying nozzles integrated on the wiper arm or wiper blade. Due to the simple and variable embodiment, however, it also functions with spraying nozzles positioned on the vehicle hood.

In order to make a flexible manufacture of a washer system according to the invention possible, it is provided, according to one embodiment of the invention, that the washer system be composed of different functional parts, such as spraying nozzles, connecting pieces, distributor elements, washer module, and the like. Couplers are thereby provided at the junction points, that connect the parts of the water line tightly to each other. In a water line having two passages that are separated from each other by means of a common dividing wall, the dividing wall is designed as a coupling in the connecting region by an extension of a dividing wall gripping in a gap on the face of the contiguous dividing wall of an adjacent functional part. An absolute tightness between the passages is not necessary, because small short-circuit currents can be tolerated.

DRAWING

Further advantages arise from the following drawing description. Exemplary embodiments of the invention are presented in the drawing. The drawing, the description, and the claims contain numerous features in combination. One skilled in the art will advantageously consider them individually as well and combine them into reasonable further combinations.

DESCRIPTION OF THE EXEMPLARY EMBODIMENTS

Figure 1:
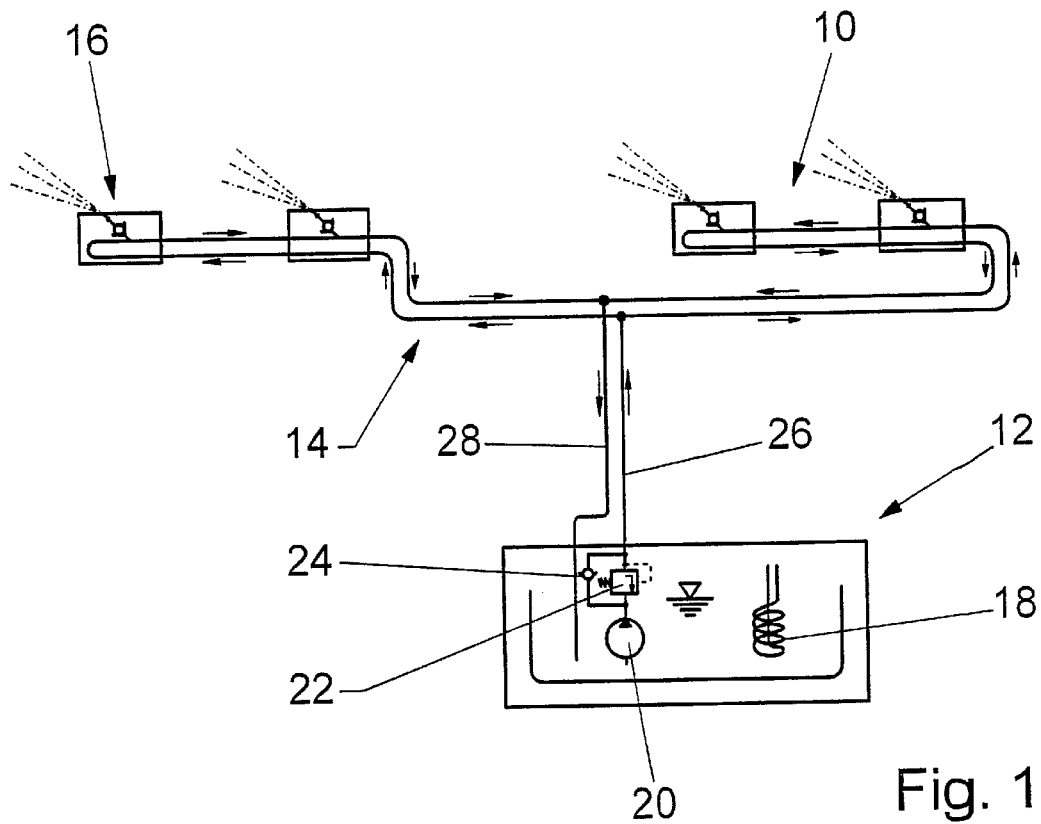
FIG. 1 shows a schematic representation of a heatable washer system.

A washer system 10 for vehicle windshields comprises at least one spraying nozzle 16, which is connected to a reservoir 12 via a water line 14 (FIG. 1). The washer fluid of the washer system 10 is located in the reservoir 12, which washer fluid is heated by means of a heating device 18, if necessary. A water pump 20 delivers washer fluid from the reservoir 12 to the spraying nozzle 16 via the water line 14. The water line 14 has two passages 26 and 28. Passage 26 is connected to the pressure side of the water pump 14, and passage 28 leads into the reservoir 12.

Washer fluid drawn by the water pump 20 is delivered via the passage 26 to the spraying nozzle 16 and, as long as it does not travel through the nozzle opening 48 of the spraying nozzle 16 into the open, flows back into the reservoir 12 via the passage 28.

In the circulating operation, the washer fluid is pumped through the water line 14 with an operating pressure that is adjusted by means of a pressure limiting valve 22 located in the passage 26. So that the washer fluid can be sprayed through the nozzle opening 48 of the spraying nozzle 16, however, the pressure in the water line 14 is increased to a spraying pressure. The increased pressure opens pressure valves that are designed as non-return valves with a hose diaphragm 38 and are located in front of the spraying nozzles 16 (FIG. 2).

In the embodiment according to FIG. 1, a controllable pressure limiting valve 22 is located on the pressure side of the water pump 20 that adjusts the respective pressure level. A pressure valve in the form of a non-return valve 24 is provided parallel to the pressure limiting valve 22 that releases a larger flow cross section when the spraying pressure is reached.

Figure 2:
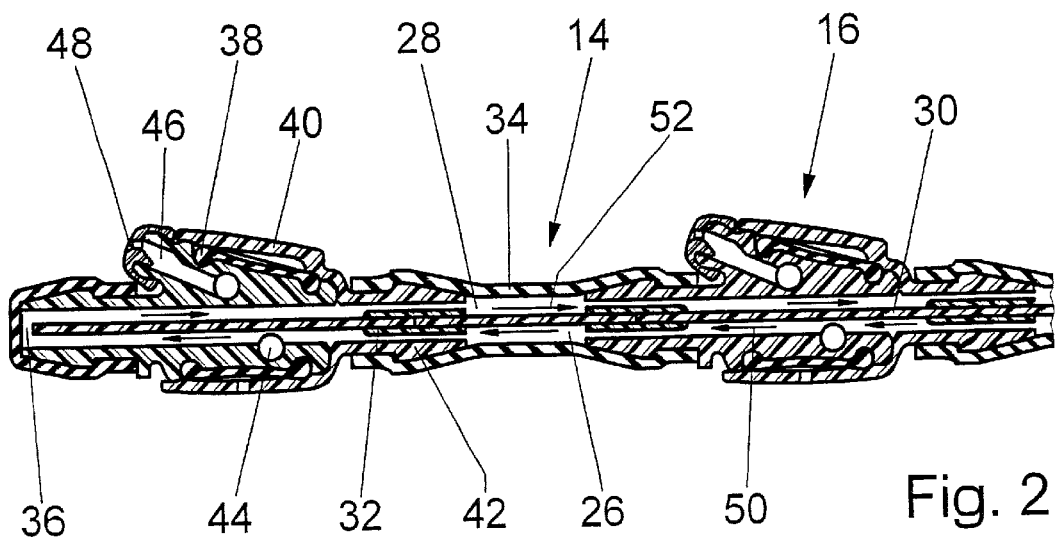
FIG. 2 shows a longitudinal view through two spraying nozzles connected by means of a water line.

The spraying nozzle 16 comprises a housing 40 that is connected to the water line 14 in such a fashion that it is detachable via a coupler 42 (FIG. 2). The housing 40 is made out of plastic and encloses a water passage 36 from which a connecting passage 44 branches off, which leads to a spraying passage 46 with a nozzle opening 48. Additionally, the spraying nozzle 16 comprises a hose diaphragm 38 that functions as pressure valve and non-return valve by releasing a connection between a connecting passage 44 and a spraying passage 46 when a specified pressure is reached. If a plurality of spraying nozzles 16 are used, each of them is connected to the water line 14 via a connecting piece 34. Exactly like the water line 14, the water passage 36 of the spraying nozzle 16 also comprises two passages 26 and 28, and the dividing walls 30 located between the passages 26 and 28 are connected to each other in the region of the couplers 42 by means of a coupling 32. The washer fluid therefore flows from the reservoir 12 in the passage 26 in the direction of the arrow 50 to the last spraying nozzle 16 and then in the passage 28 in the direction of the arrow 52 back into the reservoir 12. The connecting passage 44 of the spraying nozzle 16 is thereby filled with washer fluid up to the hose diaphragm 38. The hose diaphragm 38 expands only during the washing operation, when high pressure is present in the washer system 10, and part of the washer fluid travels through the spraying passage 46 to the nozzle opening 48 and is then sprayed over the vehicle windshield.

Figure 3:
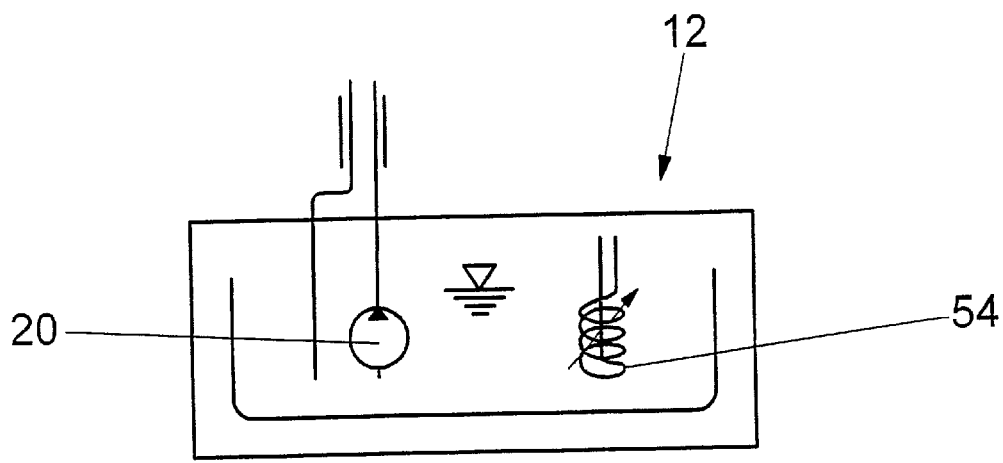
FIG. 3 is a schematic representation of a reservoir.

In stand-by operation, the water pump 20 constantly circulates washer fluid in the washer system 10, so that the water lines 14 and the spraying nozzles 16 are heated by the washer fluid. The washer fluid is heated for this in one embodiment of the invention by means of a steplessly variable heating device 54 located in the reservoir 12 (FIG. 3). The heating device 54 is advantageously controlled as a function of temperature. During the circulation procedure, a heat exchange with the surrounding components takes place, and the cooled washer fluid flowing back into the reservoir 12 is heated once more.

Figure 4:
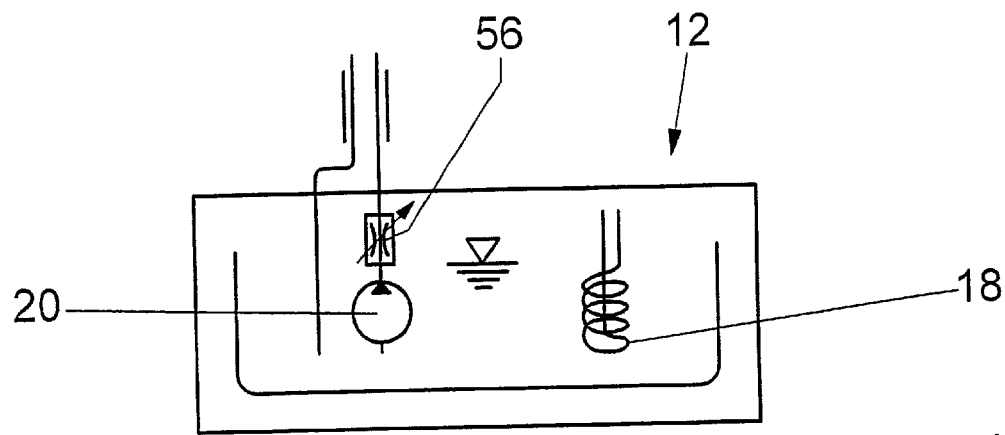
FIGS. 4–5 are variants of FIG. 3.
Figure 5:
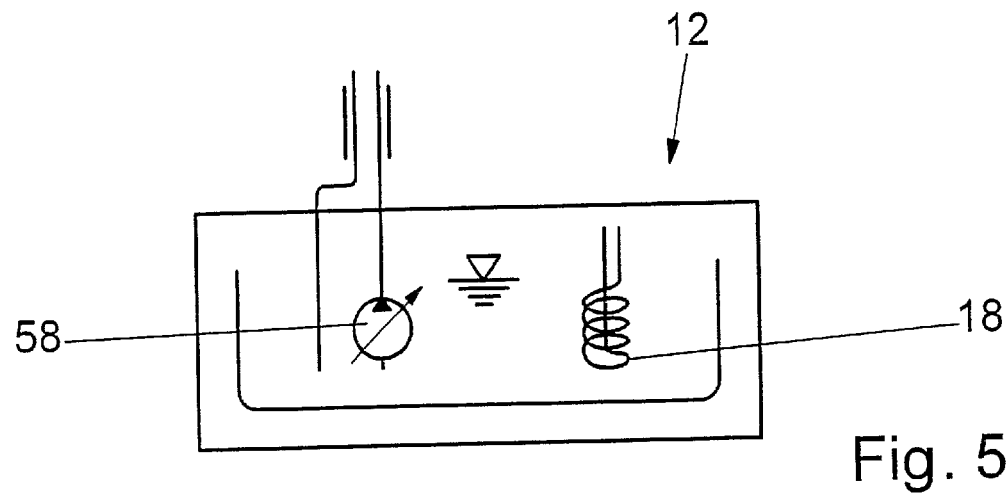

FIG. 4 shows a variant in which the addition of heat to the washer system 10 takes place via a variable flow rate of the washer fluid. According to this variant, the temperature of the washer fluid is kept constant within a certain range in the reservoir 12, and heating is provided starting at a temperature of less than +5° C., for example. At lower ambient temperatures, the flow rate of the washer fluid in the washer system 10 is increased and, therefore, more heat is also given off to the surrounding components. A restrictor 56 located after the water pump 20 or a steplessly variable water pump 58, as shown in FIG. 5, thereby controls the flow rate.

Figure 6:
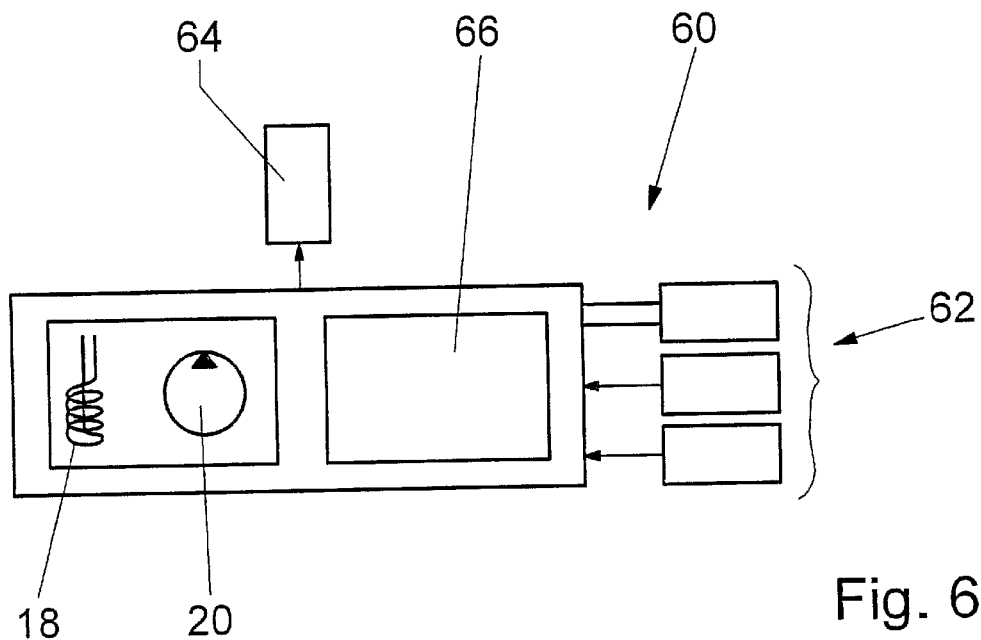
FIG. 6 is a schematic representation of a washer module.
Figure 7:
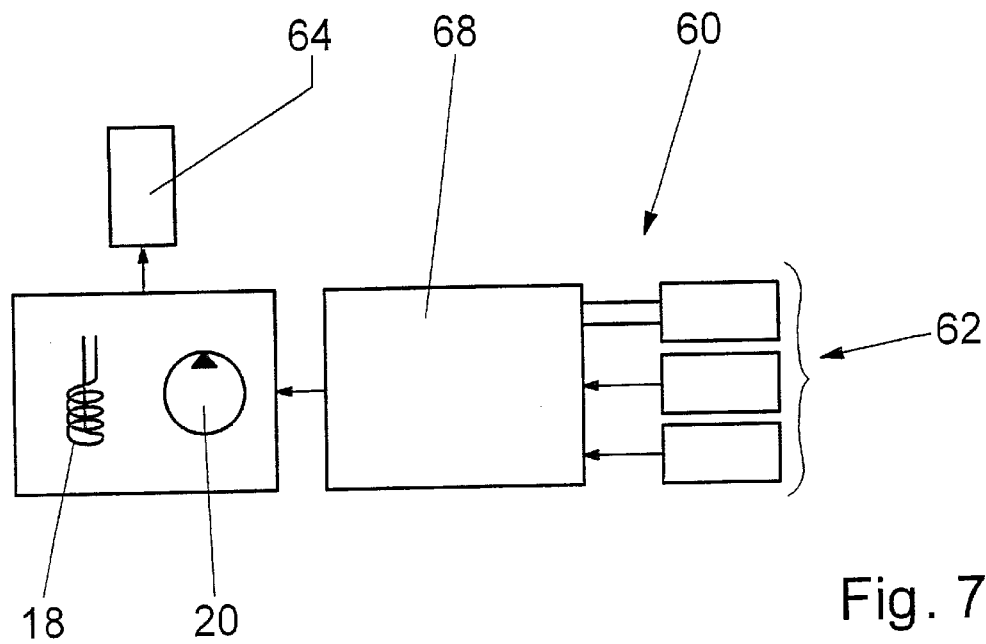
FIG. 7 is a variant of FIG. 6.

The washer system 10 advantageously has a washer module 60 with an integrated water pump 20 or 58, a heating device 18 or 54, and control electronics 66 (FIG. 6). The integrated control electronics 66 are capable of processing input signals 62, such as the ambient temperature or a signal from the steering-column switch, into an output signal 64 for the rate heat flow in the washer fluid cycle of the washer system 10. In one variant, the washer module 60 receives a signal from external control electronics 68, which can be vehicle or wiper electronics, for example (FIG. 7).

Both variants of the control electronics also make a constant or a clocked control possible in simple fashion, so that, with a constant control, the rotational speed of the water pump 58, for example, is increased at a lower ambient temperature, while, with clocked control, the ON period of the water pump 58 is varied in this temperature range.

Figure 8:
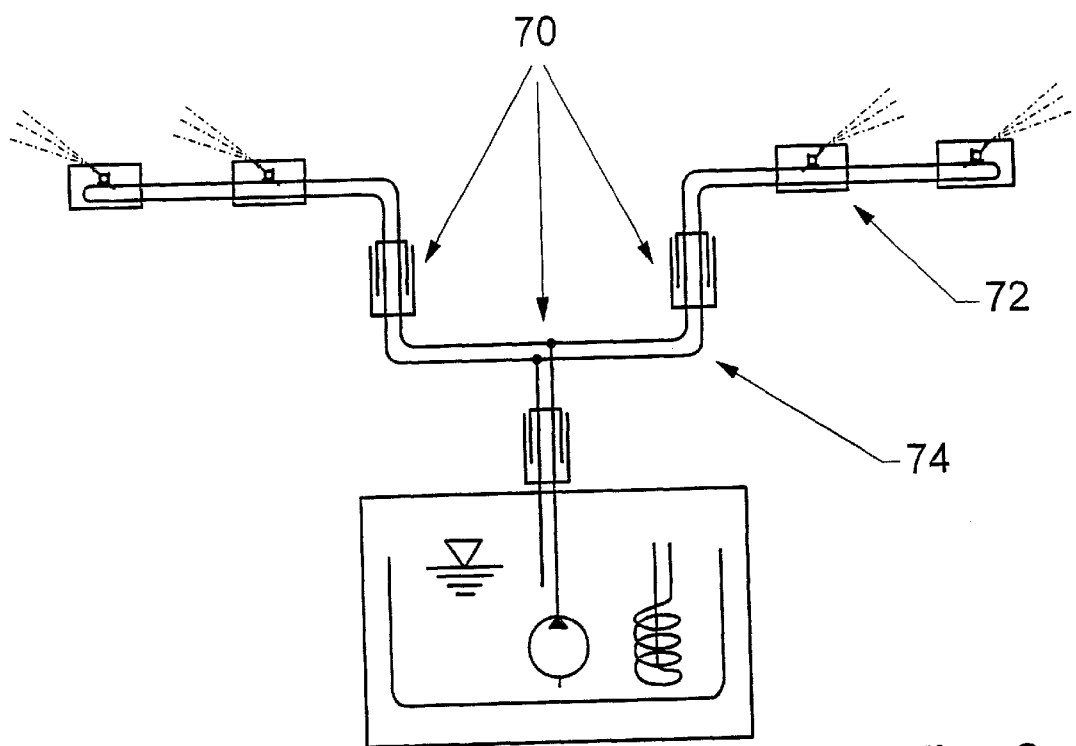
FIG. 8 is a variant of FIG. 1.

The water line 14 of the washer system 10 preferably comprises various system components, such as nozzle systems 72, connecting pieces 34 and distributor elements 74 that are connected to each other at the junction points by means of couplers 70 (FIG. 8). The connection of the water line 14 to the reservoir 12 is also formed by a coupler 70. Due to the great number of system components 34, 72, 74 and their variable assembly into a total system as washer system 10, a use in systems, in particular, having spraying nozzles 16 integrated in the wiper arm or in the wiper blade, or having spraying nozzles 16 positioned on the vehicle hood, is made possible.

What is claimed is:

1. A heatable washer system (10) for vehicle windows comprising at least one spraying nozzle (16) that is acted upon with washer fluid via a pressure valve (38), and a housing (40) of which is connected via a water line (14) to a water pump (20, 58) that delivers washer fluid from a reservoir (12) to the spraying nozzle (16), wherein a heating device (18) is located in the reservoir (12), characterized in that the water line (14) comprises two passages (26, 28), of which one passage (26) is connected to pressure side of the water pump (20), and other passage (28) is connected to the reservoir (12), the water pump (20, 58), in a first operating state, circulates the washer fluid via the water line (14), while, in a second operating state, pressure in the water line is increased to the extent that the pressure valve (38) opens toward the spraying nozzle (16), and a circulation quantity of the washer fluid in the washer system (10) is controlled as a function of temperature.

2. Washer system (10) according to claim 1, characterized in that the water pump (58) is designed as two-stepped, or it is steplessly variable.

3. Washer system (10) according to claim 1, characterized in that the pressure in the water line (14) is controlled by means of a pressure limiting valve (22) on the pressure side of the water pump (20).

4. Washer system (10) according to claim 3, characterized in that the spraying pressure controlled by means of an external signal opens a non-return valve (24) that is located on the pressure side of the water pump (20) and parallel to the pressure limiting valve (22).

5. Washer system (10) according to claim 1, characterized in that the water line (14) comprises connecting pieces (34) and distributor elements (74), to which at least one nozzle system (40, 72) is connected, and that couplers (42, 70) are present at junction points of the water line (14) and at a connection of the water pump (20, 58) or the reservoir (12).

6. Washer system according to claim 5, characterized in that dividing walls (30) are provided between the passages (26, 28) of the water line (14) and the water passage (36) that are connected to each other in the region of the couplers (42, 70) by means of a coupling (32).

7. Washer system (10) according to claim 1, characterized in that a non-return valve (24) is integrated in the spraying nozzle (16) that simultaneously serves as the pressure valve.

8. Washer system (10) according to claim 7, characterized in that the non-return valve (24) comprises a hose diaphragm (38).

9. Washer system (10) according to claim 1, characterized in that the heating device (54) is controlled in the reservoir (12) as a function of an exterior temperature.

10. Washer system (10) according to claim 1, characterized in that a flow rate of the washer fluid is changed by a steplessly variable water pump (58).

11. Washer system (10) according to claim 1, characterized in that an adjustable restrictor (56) is located after the water pump (20) in the water line (14).

12. Washer system (10) according to claim 1 characterized in that the washer system (10) comprises a washer module (60) with integrated water pump (20, 58), heating device (18, 54), and electronics (66) that process input signals (62) into an output signal (64) for rate of heat flow in the washer fluid cycle.

13. Washer system (10) according to claim 1, characterized in that the washer system (10) comprises a washer module (60) with integrated water pump (20, 58) and heating device (18, 54) that is controlled by means of external vehicle or wiper electronics (68).

* * * * *